United States Patent
Rastogi et al.

(10) Patent No.: US 9,350,594 B2
(45) Date of Patent: May 24, 2016

(54) SHARED BACK-TO-BACK USER AGENT

(71) Applicant: Avaya Inc., Basking Ridge, NJ (US)

(72) Inventors: Vipul Rastogi, Pune (MH); Kurt Haserodt, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 245 days.

(21) Appl. No.: 13/927,344

(22) Filed: Jun. 26, 2013

(65) Prior Publication Data

US 2015/0006740 A1    Jan. 1, 2015

(51) Int. Cl.
*G06F 15/16*    (2006.01)
*H04L 29/06*    (2006.01)

(52) U.S. Cl.
CPC ........ *H04L 29/06197* (2013.01); *H04L 65/105* (2013.01); *H04L 65/1006* (2013.01); *H04L 65/1069* (2013.01)

(58) Field of Classification Search
CPC . H04L 29/06; H04L 29/06197; H04L 65/105; H04L 65/1006; H04L 65/1069
USPC ........................................................ 709/227
See application file for complete search history.

(56) References Cited

U.S. PATENT DOCUMENTS

| | | | |
|---|---|---|---|
| 2004/0196867 A1* | 10/2004 | Ejzak et al. | 370/468 |
| 2006/0253538 A1* | 11/2006 | Jung | H04L 65/1006 709/206 |
| 2008/0037752 A1* | 2/2008 | Chatilov et al. | 379/202.01 |
| 2008/0155310 A1* | 6/2008 | Langen et al. | 714/6 |
| 2008/0275701 A1* | 11/2008 | Wu | G06F 17/30017 704/235 |
| 2009/0187919 A1* | 7/2009 | Maes | H04L 65/1016 719/313 |
| 2010/0220703 A1* | 9/2010 | Farrugia | H04L 65/80 370/338 |
| 2010/0329239 A1* | 12/2010 | Compienne | G06F 9/546 370/352 |
| 2011/0066694 A1* | 3/2011 | Barrett et al. | 709/207 |
| 2014/0086396 A1* | 3/2014 | Ezell et al. | 379/93.01 |

OTHER PUBLICATIONS

Rosenberg et al. "SIP: Session Initiation Protocol," The Internet Society, Jun. 2002, RFC 3261, 270 pages (available at http://www.ietf.org/rfc/rfc3261.txt).

Kulkarni et al. "SIP Servlet Specification, version 1.1," BEA Systems, Inc, JSR 289 Expert Group, Aug. 2008, 242 pages. (available at https://www.jcp.org/en/jsr/detail?id=289).

Johnston et al. "Session Initiation Protocol (SIP) Call Control—Conferencing for User Agents," The Internet Society, Aug. 2006, RFC 4579, 44 pages (available at http://tools.ietf.org/search/rfc4579).

* cited by examiner

*Primary Examiner* — Brian J Gillis
*Assistant Examiner* — Javier O Guzman
(74) *Attorney, Agent, or Firm* — Sheridan Ross P.C.

(57) ABSTRACT

Mechanisms for sharing a Back-to-Back User Agent (B2BUA) instance between a plurality of services are provided. By sharing a single B2BUA instance, the need for additional Session Initiation Protocol (SIP)-related container processes and objects is obviated. In particular, a Micro-Sequencer Application Router Service (MSARS) is provided with the ability to deploy and undeploy a plurality of Micro-Sequenced Services (MSS) as well as provide a definition of a Micro-service B2BUAhelper class which creates linked SIP Sessions.

20 Claims, 3 Drawing Sheets

SHARED BACK-TO-BACK USER AGENT

FIELD OF THE DISCLOSURE

The present disclosure is generally directed toward communications and more specifically directed toward Session Initiation Protocol (SIP)-based communications.

BACKGROUND

Although the concept of Back-to-Back User Agents (B2BUAs) is not well defined by current Session Initiation Protocol (SIP) standards (e.g., RFC 3261, the entire contents of which are hereby incorporated herein by reference), there are other standards which provide helper classes to build B2BUAs. For instance, Java Specification Request (JSR) 289, the entire contents of which are incorporated herein by reference, provides helper classes for building B2BUAs. A B2BUA is defined by a SIP entity, which terminates a SIP dialog as a User Agent Server (UAS) and regenerates a SIP dialog as a User Agent Client (UAC) to manipulate SIP dialogs once a call is set up. The types of dialog manipulation that can be achieved with a B2BUA include, without limitation, media injection, session reconnection with other SIP dialogs, etc.

JSR289 provides B2BUA helper classes that are configured to create a B2BUA for a single invoked service; hence, if multiple services are desired for a communication session (e.g., as per communication preferences of the caller and/or callee), JSR 289 dictates that a separate B2BUA is created for each service. Each B2BUA is created using a B2BUAHelper class. Such a mechanism is very resource consuming and does not scale well on high loads.

SUMMARY

As can be appreciated by one skilled in the art, there is a need for multiple B2BUA-wanting services to share just one B2BUA instance without compromising the privacy and/or flexibility currently provided by existing B2BUAHelper classes.

It is with respect to the above issues and other problems that the embodiments presented herein were contemplated.

In particular, a mechanism for sharing a single instance of a B2BUA among a plurality of services that desire to behave as a B2BUA within a single communication session is provided. Embodiments of the present disclosure, among other things, provide a protocol and set of classes for enabling multiple B2BUA-wanting services to share a single instance of a B2BUA, all while operating in accordance with SIP and JSR 289 standards.

In some embodiments, on arrival of an initial request (e.g., an INVITE message), a JSR 289 container creates a SipSession (e.g., SipApplicationSession objects) and associates the session with the request. Therefore, every time a service wants to create a B2BUA instance in connection with fulfilling service requests in the INVITE message, the JSR 289 container creates a new SipSession. Each new SipSession is used to create "otherside" SIP messages of a linked dialog. Embodiments of the present disclosure substantially prevent service-specific B2BUAs vis-à-vis the creation of multiple linked SipSessions rather than just using a single SipSession. On arrival of initial INVITE, the container passes the INVITE to a Micro-Sequencer Application Router Service (MSARS) which is configured to perform at least some of the following:

a. Create newly defined Micro-service SipRequest (MsSipRequest), which wraps the incoming SipServletRequest.

b. Create newly defined Micro-service SipSession (MsSipSession), which is then associated with above-created MsSipRequest.

c. Present the MsSipRequest to a Micro-Sequenced service (MSS). MSS provides the interface by which MSARS pushes MsSipRequest and/or Micro-service SipResponses (MsSipResponses).

If MSS wants to build B2BUA, instead of calling the B2BUAHelper class provided by JSR 289, the MSS will instead call a getLinkedSession on via a Micro-service B2BUAHelper (MsB2BUAHelper) class, which provides the MSS with an instance of a newly created MsSipSession. The MSS then creates a request (e.g., an MsSipRequest) on the newly created MsSipSession to send message back to MSARS. Upon receiving the MsSipRequest, MSARS checks if it has more services MSS to present with the request. If so, MSARS repeats above procedure as long as it finds another requested service within the INVITE (e.g., identifies another MSS who wants to see MsSipRequest). Finally when the MSARS does not have any more MSSs to invoke, the MSARS creates a single B2BUA instance using JSR 289 provided B2buaHelper class. This results in the creation of a SipServletRequest in the newly created SipSession and propagates changes made in MsSipRequest to SipServletRequest and sends SipServletRequest to the JSR 289 container. MSARS then creates an Initial Path Service Vector (IPSV) for the communication session (e.g., call) and stores in SipApplicationSession. The IPSV stores each of the MSS instances in order of their invocation by MSARS.

When a response to the INVITE (e.g., 200OK, ACK, etc.) comes to the JSR 289 container, the container passes the response to MSARS which is configured to perform at least some of the following:

a. Create newly defined MsSipReponse which wraps incoming SipServletResponse.

b. Associate MsSipSession to above created MsSipResponse.

c. Present MsSipResponse to service which comes last in processing of initial INVITE.

MSARS keeps on presenting each response in reverse order of the IPSV after changing the MsSipSession and MsSipResponse with every presentation. When there is no MSS left (to present), the MSARS creates a SipServlet response using JSR 289 provided B2BUAHelper class, and then propagates the changes made in MsSipResponse, which are then passed back to the container.

For any in-dialog request/response, MSARS detects if request/response is referencing the initial INVITE. If so, then the MSARS presents the request in the order defined by the IPSV or, for responses, in reverse order of the IPSV.

Since just one SipApplicationSession and two SipSession are used irrespective of number of B2BUA-wanting services, only a single B2BUA is invoked and a substantial amount of container resources (e.g., memory, processing resources, etc.) are saved.

In some embodiments, a method of invoking a B2BUA is provided, which generally comprises:

receiving an INVITE at a container;

determining, by the container, that a plurality of services are requested in connection with servicing the received INVITE;

invoking a sequencer to request each of the plurality of services via a plurality of microservices; and providing each of the plurality of services with a single B2BUA.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
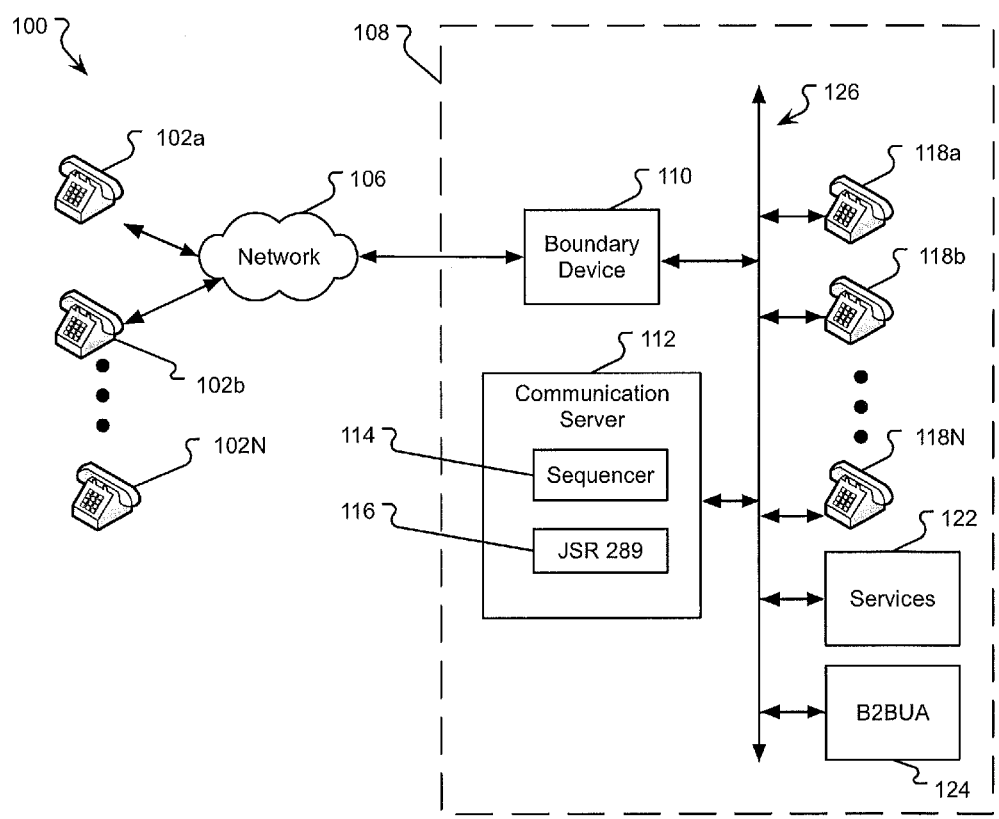
FIG. 1 is a block diagram of a communication system in accordance with embodiments of the present disclosure.

FIG. 1 shows an illustrative embodiment of an illustrative communication system 100 in accordance with at least some embodiments of the present disclosure. The communication system 100, as depicted, includes an enterprise communication network 108 that is configured with internal communication devices 118a-N, a boundary device 110, one or more communication server s112, one or more services 122, and one or more B2BUAs 124, which are all connected to one another via one or more network backbones 126.

In the depicted embodiment, the enterprise network 108 is connected to one or more external communication devices 102a-N via an external communication network 106. In some embodiments, the external communication network 106 is separated or insulated from the network backbone 126 via the network boundary device 110. The communication network 106 may be packet-switched and/or circuit-switched. An exemplary communication network 106 includes, without limitation, a WAN, such as the Internet, a Public Switched Telephone Network (PSTN), a Plain Old Telephone Service (POTS) network, a cellular communications network, or combinations thereof. In one configuration, the communication network 106 is a public network supporting the TCP/IP suite of protocols.

In some embodiments, a network boundary device 110 may comprise one or more of a firewall, Session Border Controller (SBC), gateway, Network Address Translator (NAT), or the like and may be provided to establish and maintain security provisions of the enterprise network 108. More specifically, the network boundary device 110 may be utilized because the network 106 may be untrusted (e.g., the Internet), but the enterprise communication network 108 may be administered by a particular entity or enterprise that has specific communication rules, policies, etc. that are enforced within the enterprise communication network 108. One or more system administrators for the entity may be employed to enforce and maintain the communication rules, policies, etc. within the enterprise communication network 108. As such, the enterprise communication network 108 may be considered "trusted" network whereas communication network 106 may be public or an "untrusted" network. Likewise, the external communication devices 102a-N may be considered untrusted devices by virtue of their connection to the network 106.

The enterprise communication network 108 may correspond to either a single-location enterprise network or a multi-location enterprise network. A single-location enterprise network may comprise a single network backbone 126 that corresponds to a Local Area Network (LAN) that includes wired and/or wireless technologies. A multi-location enterprise network 108 may comprise a network backbone 126 that is a Wide Area Network (WAN), which connects a plurality of LANs or similar network locations via one or more untrusted networks (e.g., the Internet, a cellular network, an IMS network, an ISDN network, a PSTN, etc.).

The internal communication devices 118a-N may correspond to user communication devices and, in some embodiments, may also include a UAC or multiple UACs of enterprise users. Examples of communication devices 118a-N include, without limitation, a telephone, a softphone, a cellular phone, a multi-speaker communication device (e.g., conference phone), a video phone, a Personal Computer (PC), a laptop, a tablet, a Personal Digital Assistant (PDA), a smartphone, a thin client, or the like. It should be appreciated that a communication device 118 may be configured to support single or multi-user interactions with other communication devices 118 within the enterprise network 108 as well as other communication devices 102a-N that are external to the enterprise network 108. Thus, the communication devices 102a-N may be similar or identical to the types of communication devices 118a-N maintained within the enterprise network 108.

In some embodiments, communication sessions between communication devices 102, 118 (which may also be referred to herein as UACs or UAs) may be direct or may traverse one or more of the communication server 112, the B2BUA 124, the services 122, and/or components thereof. The communication session(s) described herein may be established in accordance with protocols described in RFC 3261 and/or 4579, the entire contents of which are hereby incorporated herein by reference. Accordingly, control signaling for the communication session may be separated from the media stream, which may correspond to a Real-time Transport Protocol (RTP) or Secure RTP (SRTP) media stream. In some embodiments, the control signaling of a communication session may traverse an IPSV (either backward or forward) from one communication device to another as well as any other component situated therebetween (e.g., communication server 112, B2BUA 124, etc.). In some embodiments, the media may flow directly from one communication device to another without traversing any intermediate devices in the signaling path. In some embodiments, the media may flow through the B2BUA 124 if one or more services 122 utilize the B2BUA 124 to monitor, copy, and/or control aspects of the media interaction during the communication session.

In some embodiments, the communication server 112 comprises a sequencer 114 and container 116. In some embodiments, the container 116 comprises a JSR 289 container. The sequencer 114 may correspond to functionality used by or within the container 116 to establish communication sessions and/or set up an IPSV for a communication session. The communication server 112 may include a Private Branch eXchange (PBX), an enterprise switch, an enterprise server, combinations thereof, or other type of telecommunications system switch or server. The communications server 112 is, in some embodiments, configured to execute telecommunication functions such as the suite of Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 112 is depicted in FIG. 1, two or more communications servers 112 may be provided in a single enterprise network 108 or across multiple separate LANs owned and operated by a single enterprise, but separated by an untrusted communication network. In configurations where an enterprise or an enterprise network 108 includes two or more communications servers 112, each server 112 may comprise similar functionality, but may be provisioned for providing its features to only a subset of all enterprise users. In particular, a first communications server 112 may be authoritative for and service a first subset of enterprise users whereas a second communications server 112 may be authoritative for and service a second subset of enterprise users, where the first and second subsets of users generally do not share a common user.

Additionally, multiple servers 112 can support a common user community. For example, in geo-redundant and other applications where users aren't necessarily bound to a single application server, there may be a cluster of equivalent servers where a user can be serviced by any server in the cluster.

A communications server 112 can be configured to include user communication preferences, which map, for a corresponding (enterprise subscriber) user, a set of communication preferences to be invoked for an incoming and/or outgoing contact for each user for whom it is authoritative. Even more specifically, communications between internal enterprise users (e.g., internal communication devices 118) may first be serviced by the originating user's authoritative communications server 112 during the origination phase of communications set-up. After the origination phase is complete, the authoritative communications server 112 of the terminating (or called) user may be invoked to complete the termination phase of communications set-up. In some embodiments, the communications server 112 for the originating and terminating user may be the same, but this is not necessarily required. In situations where more than two enterprise users are involved in a communication session, authoritative communications servers 112 for each of the involved users may be employed without departing from the scope of the present invention. Additionally, the authoritative communications servers 112 for each user may be in the same enterprise network 108 or in different enterprise networks 108, which are owned by a common enterprise but are separated by an untrusted communication network.

As discussed above, the communication sever 112 may include a feature sequencer that is configured to instantiate the communication preferences 116 for a calling and called user. In some embodiments, the user communication preferences 116 may be provisioned by users and/or by administrative personnel. The communications preferences for a particular user are referenced by the feature sequencer functionality of the communication server to determine which, if any, features should be incorporated into a communication session for the user. The feature sequencer functionality can actually provide communication features directly into the communication session or the feature sequencer functionality can determine an application sequence which will be invoked during set-up and used during the communication session.

In accordance with at least some embodiments, the communication server 112 utilizes the sequencer 114 and container 116 to determine and invoke one or more services 122 via a single B2BUA 124. In particular, the communication server 112 is configured to analyze a particular user's communication preferences and/or analyze contents of an INVITE message to invoke the necessary services 122 to fulfill such preferences.

Moreover, the sequence of services 122 can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-party communications (e.g., conference call) are established and conducted and these preferences may vary depending upon whether the multi-party communication is established initially or whether it is established on an ad-hoc basis.

The services 122 that are provided for a communication session may be provided via the B2BUA 124. Services 122 may vary according to media-type, function, and the like. Exemplary types of services 122 include, without limitation, an EC-500 (extension to cellular) service, a call-setup service, a call-recording service, a dynamic device pairing service, a voicemail service, an email service, a voice service, a video service, a text service, a conferencing service, a communication log service, a security service, an encryption service, a collaboration service, a whiteboard service, mobility services, presence services, media services, messaging services, bridging services, and any other type of service that can supplement or enhance communications.

In some embodiments, when the communication server 112 includes one or more services 122 in a communication session, those services 122 may be provided by the single B2BUA 124. When a service 122, or any other communication element, behaves as a B2BUA, the service inserts itself in the control signaling path so that it can maintain complete call state and participate in all call requests.

It should be appreciated that some or all of the functions depicted in FIG. 1 may be co-hosted and/or co-resident on a single server. The depiction of components in FIG. 1 is generally intended to be a logical depiction of the components of the system 100.

Figure 2:
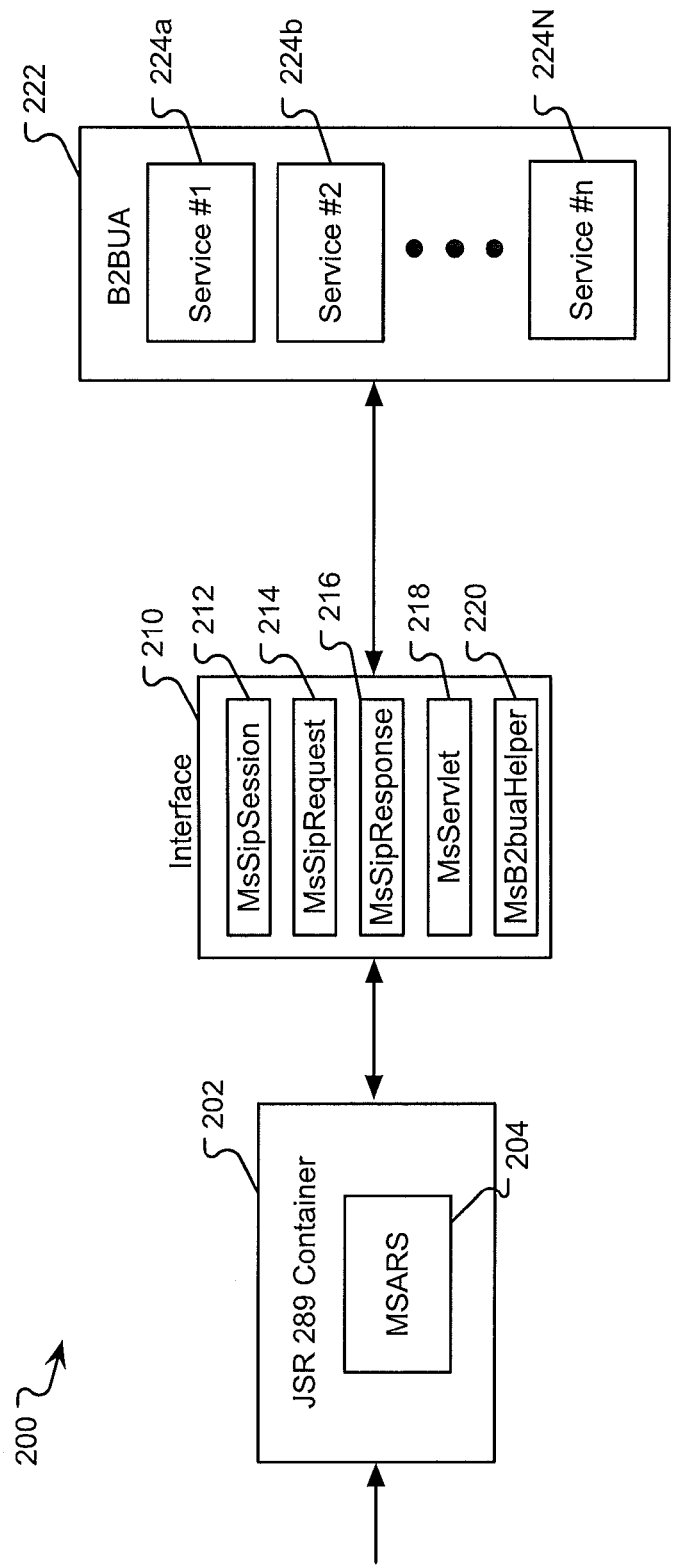
FIG. 2 is a block diagram of server components in accordance with embodiments of the present disclosure.

With reference now to FIG. 2, additional details of components that may be maintained within a server 112 will be described in accordance with embodiments of the present disclosure. As discussed in FIG. 1, the server 112 may include a sequencer 114 and container 116. In more specific embodiments, the server componentry 200 may include a JSR 289 container 202 and an interface 210 between the JSR 289 container 202 and the B2BUA 222, which may be similar or identical to the B2BUA 124.

The JSR 289 container 202 may include a Micro-Sequencer Application Router Service (MSARS) 204. The MSARS 204 may correspond to the only service hosted on the JSR 289 container 202 and may be configured to perform the following functions: (i) provide a framework to deploy/undeploy Micro-Sequenced Servicers (MSSs); (ii) sequence SIP messages across deployed services 122 in an order defined by the IPSV; (iii) convert JSR 289-defined objects (e.g., SipSession, SipServletRequest, and SipServletResponse) into newly defined objects (e.g., MsSipSession 212, MsSipRequest 214, and MsSipResponse 216, respectively), and vice versa; and (iv) provide a definition of a MsB2BUAHelper class 220, which creates linked MsSipSessions.

The interface 210 proposed herein may include one or more objects defined and used by the MSARS 204. The MsSipSession 212, as an example, may provide an interface which wraps JSR 289-defined SipSessions. Similarly, the MsSipRequest 214 may provide an interface which wraps JSR 289-defined SipServletRequests and provides a method to retrieve MsSipSessions associated therewith. The MsSipRequest 214 may also provide a method to get a MsB2BUAHelper 220 instance associated with the MsSipSession. The MsSipResponse 216 may provide an interface which wraps JSR 289-defined SipServletResponses and provides a method to retrieve MsSipSessions associate therwith. The MsServlet 218 may provide an interface which enables a method to present MsSipRequests and MsSipResponses to a sequencer 114.

In some embodiments, the interface 210 enables the MSARS 204 to accommodate a plurality of services 224a-N by invoking a single B2BUA 222. As will be described herein, each service 224a-N may correspond to a Micro-Sequenced Service (MSS), which is a set of classes (e.g., Java classes) that provide an implementation of an MsServlet Interface. The MSARS 204, which may be similar or identical to the sequencer 114 of FIG. 1, may be responsible for performing the sequencing functions whereas the MSSs may ultimately provide the services 224a-N via the single B2BUS 222.

Figure 3:
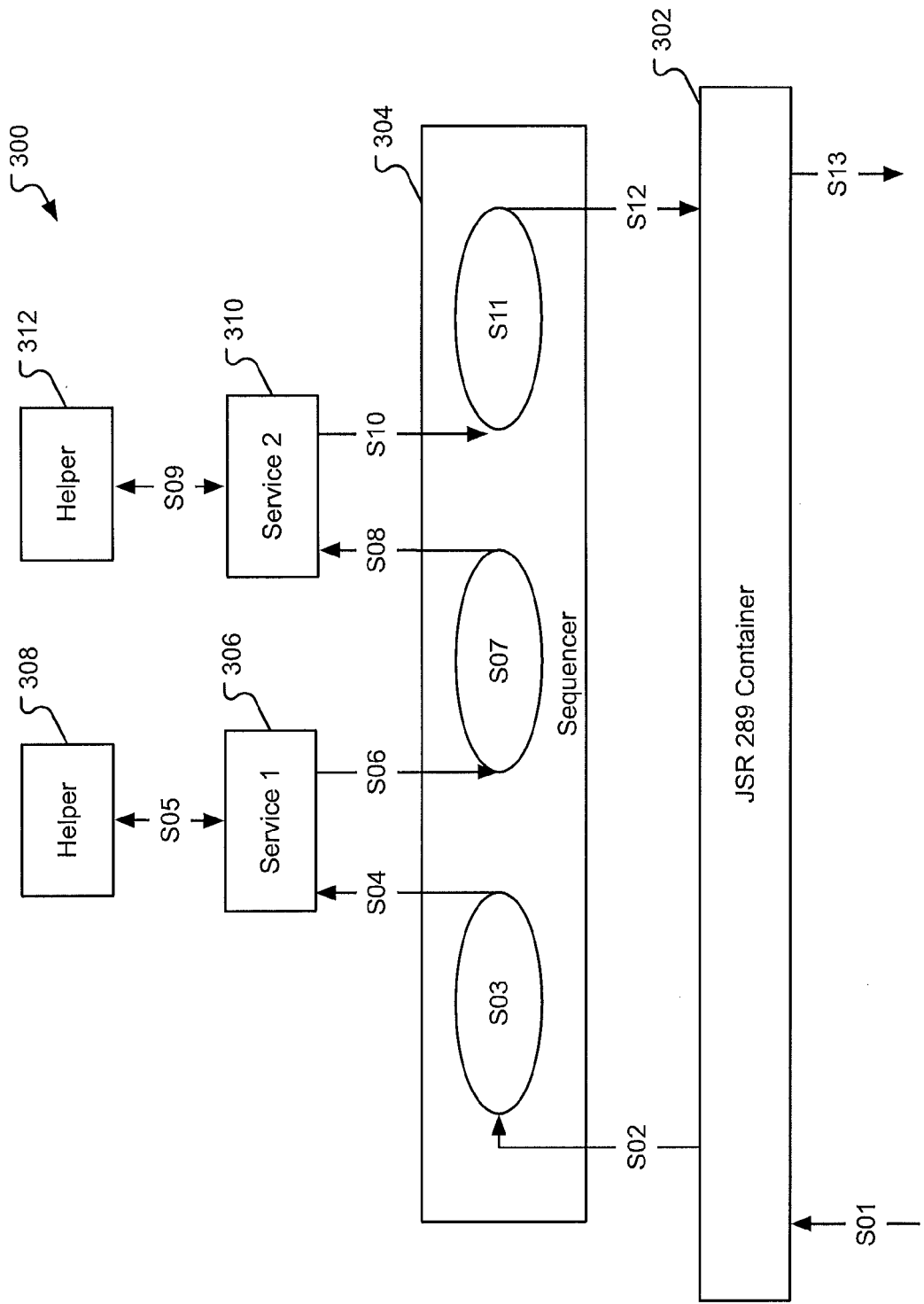
FIG. 3 is a flow diagram of a B2BUA invocation method in accordance with embodiments of the present disclosure.

With reference now to FIG. 3, additional details of the sequence of operations performed by the server components 200 will be described in accordance with embodiments of the present disclosure. The method 300 may be executed by the combined actions of the JSR 289 container 302, sequencer 304, services 306, 310, and helpers 308, 312, which may correspond to the JSR 289 container 202, MSARS 204, services 224a-N, and MsB2BUAHelper 220, respectively depicted and described in connection with FIG. 2.

Initially, an INVITE message is received at the JSR 289 container 302 (step S01). In some embodiments, the INVITE message may initially comprise the following parameters: INVITE [SipServletRequest, SipSession, IPSV]. The SipServletRequest may identify the requested services and the SipSession may identify the communication session in which the INVITE message was transmitted.

Upon receiving the INVITE message, the JSR 289 container 302 presents the INVITE message to the sequencer 304 (step S02). Specifically, the JSR 289 container 302 may present the SipServletRequest obtained from the INVITE message to the sequencer 304. The sequencer 304 analyzes the INVITE message (step S03) and determines that one or more MSSs or services are needed to service the communication session. Specifically, in the example of FIG. 3, the sequencer 304 determines that two services (e.g., a first MSS and a second MSS) are needed in that order. The sequencer 304, therefore, converts the SipServletRequest obtained from the INVITE into a MsSipRequest (e.g., "MsSipRequest1") and further converts the SipSession obtained from the INVITE message into a MsSipSession (e.g., "MsSipSession1"). The sequencer 304 then creates an instance of an MSS (e.g., first service 306) and uses the MsServlet interface 218 to present the MsSipRequest1 to the first service 306 (step S04).

Upon receiving the MsSipRequest1, the first service 306 determines that it wants to create a B2BUA; therefore, the first service 306 obtains an instance of a B2BUAHelper (e.g., helper 308) from the MsSipRequest1 and invokes a createRequest Application Programmer's Interface (API) on the initial invite (step S05). In some embodiments, the first service 306 creates an initial invite (e.g., MsSipRequest2) on MsSipSession2 and links this new invite with MsSipSession1. The linking may be performed by simply storing some information about MsSipSession1 in one or both of MsSipRequest2 and MsSipSession2.

After the helper 308 has been invoked and the new invite has been created, the first service 306 sends the newly-created request (e.g., MsSipRequest2) back to the sequencer 304 (step S06). The sequencer 304 then checks the newly-created request to see if any other services are desired (step S07). Specifically, the sequencer 304 may determine if any other MSS wants to see the message. In the example of FIG. 3, the sequencer 304 determines that a second service 310 (e.g., MSS2) wants to receive the request and insert itself into the IPSV. The sequencer 304 then creates an instance of an MSS (e.g., second service 310) and uses the MsServlet interface 218 to present the MsSipRequest2 to the second service 310 (step S08).

Upon receiving the MsSipRequest2, the second service 310 decides that it also wants to create an instance of a B2BUA; therefore, the second service 310 obtains an instance of a B2BUAHelper (e.g., helper 312) from the MsSipRequest2 and invokes a createRequest API on this (step S09). This invocation of the createRequest results in the creation of an initial invite (e.g., MsSipRequest3) on MsSipSession3 and the newly-created request is linked with MsSipSession2. This causes the sequencer 304 to retrieve the IPSV of the communication session and push the second service 310 into the IPSV (e.g., after the first service 306). The second service 310 then sends the newly-created request (e.g., MsSipRequest3) back to the sequencer 310 (step S10) where it is further analyzed by the sequencer 304 (step S11). During this analysis, the sequencer 304 determines that no additional services a required. According, the sequencer 304 creates a B2BUA instance 222 by using the JSR 289-provided B2BUAHelper class. Assuming that the linked SipSession is SipSession2, the sequencer 304 creates a SipServletRequest2 on SipSession2 and propagates the changes made in MsSipRequest3.

Thereafter, the sequencer 304 sends the SipServletRequest2 back to the container 302 (step S12). This results in the container 302 sending out the SipServletRequest2 exactly as it sees it and the INVITE is forwarded along to either the target endpoint or to the callee's communication server 112 for additional processing (step S13). In some embodiments, the JSR 289 container sends out the SipServletRequest2 and sees just a single B2BUA instance 222 that has been created by the sequencer 304. In some embodiments, there is a single instance of a B2BUA irrespective of the number of B2BUA-wanting services.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of invoking a Back-to-Back User Agent (B2BUA), comprising:
    receiving an INVITE at a communications server comprising a container;
    determining, by the container, that a plurality of services are requested in connection with servicing the received INVITE and each of at least two of the plurality of services is associated with the creation of a B2BUA;
    invoking, by the communications server, a sequencer to request each of the plurality of services; and
    providing, by the communications server, each of the plurality of services with a single B2BUA;
    wherein the communications server comprises the sequencer and the container; and
    wherein the plurality of services are utilized in a communication session associated with the INVITE received at the container.

2. The method of claim 1, further comprising:
    parsing the received INVITE;
    extracting a SipServeletRequest from the parsed INVITE; and
    requesting a first microservice in connection with providing a first service from the plurality of services, wherein requesting the first microservice comprises:
        generating a first modified request based on the extracted SipServletRequest;
        accessing an interface and, via the interface, presenting the first modified request to the first microservice; and
        receiving, from the first microservice, a second modified request.

3. The method of claim 2, further comprising:
requesting a second microservice in connection with providing a second service from the plurality of services, wherein requesting the second microservice comprises:
generating a third modified request based on the second modified request;
accessing the interface and, via the interface, presenting the third modified request to the second micro service; and
receiving, from the second microservice, a fourth modified request.

4. The method of claim 3, further comprising:
receiving, by the first microservice, the first modified request;
determining, by the first microservice, that the first modified request includes a request for the creation of a B2BUA;
accessing, by the first microservice, a first B2BUAhelper;
creating, via the first B2BUAhelper, the second modified request on a first new INVITE;
linking the first new INVITE to the first modified request; and
returning the second modified request to the sequencer.

5. The method of claim 4, further comprising:
receiving, by the second microservice, the third modified request;
determining, by the second microservice, that the third modified request includes a request for the creation of the single B2BUA;
accessing, by the second microservice, a second B2BUAhelper;
creating, via the second B2BUAhelper, the fourth modified request on a second new INVITE;
linking the second new INVITE to the fourth modified request; and
returning the fourth modified request to the sequencer.

6. The method of claim 5, further comprising:
invoking the single B2BUA, by the sequencer, by creating a reply SipServletRequest on an updated SipSession; and
returning, by the container, the single B2BUA in response to the received INVITE.

7. The method of claim 5, wherein the single B2BUA provides each of the plurality of services requested in connection with servicing the INVITE.

8. The method of claim 1, wherein the container comprises a JSR 289 container.

9. A non-transitory computer-readable medium having stored thereon instructions that cause a computing system to execute a method, the instructions comprising:
instructions that receive an INVITE at a communications server comprising a container;
instructions that determine that a plurality of services are requested in connection with servicing the received INVITE;
instructions that cause the communications server to invoke a sequencer to request each of the plurality of services;
instructions that invoke each of the plurality of services with a single B2BUA;
wherein the communications server comprises the sequencer and the container; and
wherein the plurality of services are utilized in a communication session associated with the INVITE received at the container.

10. The non-transitory computer-readable medium of claim 9, further comprising:
instructions that parse the received INVITE;
instructions that extract a SipServeletRequest from the parsed INVITE; and
instructions that request a first microservice in connection with providing a first service from the plurality of services, wherein requesting the first microservice comprises:
generating a first modified request based on the extracted SipServletRequest;
accessing an interface and, via the interface, presenting the first modified request to the first microservice; and
receiving, from the first microservice, a second modified request.

11. The non-transitory computer-readable medium of claim 10, further comprising:
instructions that request a second microservice in connection with providing a second service from the plurality of services, wherein requesting the second microservice comprises:
generating a third modified request based on the second modified request;
accessing the interface and, via the interface, presenting the third modified request to the second micro service; and
receiving, from the second microservice, a fourth modified request.

12. The non-transitory computer-readable medium of claim 11, further comprising:
instructions that receive the first modified request;
instructions that determine that the first modified request includes a request for the creation of a B2BUA;
instructions that access a first B2BUAhelper;
instructions that create, via the first B2BUAhelper, the second modified request on a first new INVITE;
instructions that link the first new INVITE to the first modified request; and
instructions that return the second modified request to the sequencer.

13. The non-transitory computer-readable medium of claim 11, further comprising:
instructions that receive the third modified request;
instructions that determine that the third modified request includes a request for the creation of the single B2BUA;
instructions that access a second B2BUAhelper;
instructions that create, via the second B2BUAhelper, the fourth modified request on a second new INVITE;
instructions that link the second new INVITE to the fourth modified request; and
instructions that return the fourth modified request to the sequencer.

14. The non-transitory computer-readable medium of claim 13, further comprising:
instructions that invoke the B2BUA, by the sequencer, by creating a reply SipServletRequest on an updated SipSession; and
instructions that return the single B2BUA in response to the received INVITE.

15. A communication system, comprising a communications server, comprising:
a first microservice running on the communications server that provides a first service in connection with a communication session and requests invoking a first Back-to-Back User Agent (B2BUA);
a second microservice running on the communications server that provides a second service in connection with the communication session and requests invoking a second B2BUA different from the first B2BUA;

a micro-sequencer application router service running on the communications server, that receives an INVITE transmitted in connection with the communication session and both the first and second microservices to be executed by a single B2BUA, thereby enabling the first and second microservices to provide the first and second services, respectively, to the communication session while only invoking the single B2BUA; and a container running on the communications server that receives the INVITE and provides the INVITE to the micro-sequencer application router service; and wherein the first microservice and second microservice are utilized by a communication session associated with the INVITE received at the micro-sequencer application router service.

16. The system of claim 15, wherein the first microservice is provided via a first B2BUAhelper, which creates a SipServletRequest and SipServletResponse on a SipSession.

17. The system of claim 16, wherein the second microservice is provided via a second B2BUAhelper, which creates a second SipServletRequest and second SipServletResponse that are linked to the SipSession.

18. The system of claim 15, wherein the container comprises a JSR 289 container.

19. The system of claim 15, wherein the first and second microservice comprise a set of classes, which provide an implementation of a microservice servlet interface.

20. The system of claim 15, wherein the communication server:

parses the received INVITE;

extracts a SipServeletRequest from the parsed INVITE; and requests the first microservice in connection with providing a first service from the plurality of services, wherein requesting the first microservice comprises:

generating a first modified request based on the extracted SipServletRequest;

accessing an interface and, via the interface, presenting the first modified request to the first microservice; and receiving, from the first microservice, a second modified request.

* * * * *